Nov. 10, 1936. K. KRANTZ 2,060,579
VEHICLE WINDSHIELD
Filed May 14, 1936

INVENTOR
Kasmer Krantz,
BY
Bean, Brooks, Buckley & Bean.
ATTORNEYS

Patented Nov. 10, 1936

2,060,579

UNITED STATES PATENT OFFICE 2,060,579

VEHICLE WINDSHIELD

Kasmer Krantz, Buffalo, N. Y.

Application May 14, 1936, Serial No. 79,750

3 Claims. (Cl. 98—2)

This invention relates to means for preventing the condensation of moisture on the surface of vehicle windshields or windows and for ventilating the interior of vehicles.

It has heretofore been proposed to prevent or deter condensation of moisture on the windshields of automobiles by directing thereagainst a blast of fluid of a variety of kinds. The objectionable condensation usually takes place as a result of the outside air being substantially colder than the air inside the vehicle.

One of the principal features of the invention involves the provision of means whereby a stream of air, induced by movement of the vehicle, is conducted into the interior of the vehicle and then directed against and across the inner surface of the windshield in the form of an air-film. This film of air, being at substantially the temperature of the air striking against the outer surface of the windshield, tends to equalize the temperatures prevailing on the opposite sides of the windshield and thereby eliminates the cause of deposition or condensation of moisture upon the surface of the windshield.

The invention includes a fluid guiding member which is selectively adjustable with relation to the quantity of fluid which it will permit to flow in the system and the direction in which it will be guided.

This enables the user, through simple manipulation, to provide free ventilation for the vehicle interior, or restricted fluid passage for removal of windshield condensation without undesirable chilling of the vehicle interior; or the device may be completely closed to prevent ingress of any outside air, as may be desired.

Figure 2:
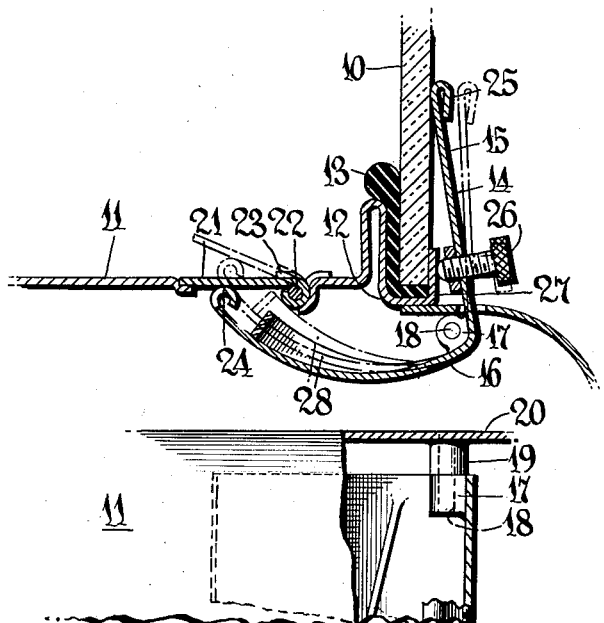
Fig. 2 is a cross sectional view taken on the line II—II of Fig. 1.
Figure 1:
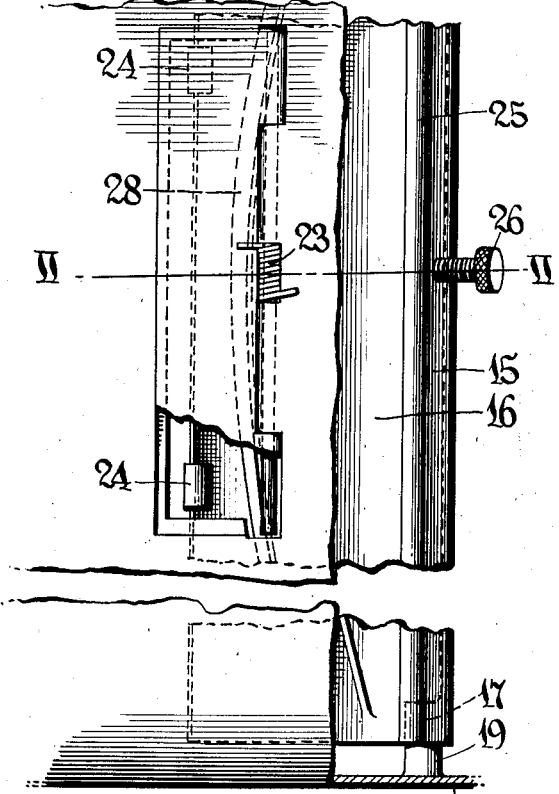
Fig. 1 is a fragmentary top plan view of the cowl portion of a vehicle adjacent the windshield thereof with the windshield and windshield frame broken away.

In the embodiment of the invention illustrated, the numeral 10 designates the windshield usually provided in motor vehicles and 11 designates the cowl or bonnet which ordinarily extends forwardly from a point approximately adjacent the base of the windshield. In the present instance I have shown a windshield 10 which is either fixedly mounted in its frame or capable of vertical sliding movement, but it will be understood that I do not intend to limit myself to this construction. The cowl 11 terminates rearwardly in a channel portion 12 which is provided with a resilient cushioning strip 13 that provides a seat for the base of the windshield 10.

An elongated vertically extending fluid guiding element is indicated generally at 14. The member 14 has a substantial vertically extending portion 15 and an arcuate, generally horizontally extending portion 16. Approximately at the juncture of these portions and at each end of the member 14 there is provided a bearing 17 carrying a pintle 18, which is journalled in bearings 19, formed upon the vertically extending side wall 20 of the cowl 11, or at any other convenient point on the framework of the vehicle. This pintle and bearing construction mounts the member 14 for pivotal movement about its longitudinal axis.

The cowl 11 is provided with a movable plate member 21 which is hinged to the cowl at its rearward edge by means of a hinge pin 22. A torsion spring 23 is carried by the hinge pin and is so positioned as to urge the plate member 21 counterclockwisely and into a closed position with respect to the opening therefor provided in the cowl 11.

The outer edge of the arcuate portion 16 of the member 14 is provided with projections 24 which bear against the underside of the plate member 21. The opposite edge of the member 14 is folded back upon itself as at 25 to provide a smooth edge and the vertically extending portion 15 of the member 14 carries an adjusting screw 26 which bears against a portion 27 of the channel 12 formed upon the cowl 11.

In the position illustrated in the drawing and particularly in Fig 2, the parts of the device are in a position in which it will function neither as a condensation preventer nor as a ventilator. The plate member 21 is in a closed position with respect to the opening in the cowl 11 and the vertically extending portion 15 is so disposed that its upper edge portion lies closely against the inner surface of the windshield 10. By turning the adjusting screw 26 inwardly, the end thereof bearing against the portion 27 of the cowl will rock the member 14 clockwisely about its pivots 18 thereby creating a space between the upper edge of the portion 15 of the member 14 and the windshield 10 and also partially opening the plate member 21 through the action of the projections 24 thereagainst and against the resistance of the hinge spring 23.

When it is desired to utilize my present invention as a condensation preventer, and such use is desired usually in cold weather, the opening created between the windshield and the vertically extending portion 15 of the member 14 will be minute and the opening of the plate member 21 correspondingly small. It will be noted that the transverse extent of the plate member 21 has, in the present instance, been illustrated as being much shorter than the transverse extent of the member 14. To assist in distributing the air emitted at 21, substantially uniformly across the member 14 before the exit of the air between the member 14 and the windshield 10, a deflector 28 has been provided. This deflector comprises a generally transversely extending wall which is positioned upon and approximately perpendicular to the arcuate portion 16 of the member 14. The central portion of the deflector 28 is substantially beneath the plate member 21, but the wall extends somewhat rearwardly as it approximates its terminal portions and the height of the wall greatly decreases toward its outer edges.

In summertime, when the problem of preventing condensation of moisture is ordinarily not present, but it is desired to effect a relatively rapid change of air in the vehicle interior, the adjusting screw 26 may be screwed inwardly to cause a much greater opening, as illustrated in the broken line position in Fig. 2. Thus a highly satisfactory means for freely ventilating the interior of the vehicle is obtained by causing movement of a current of air rearwardly and substantially across the top portion of the interior of the vehicle.

It is to be understood that this invention is not to be limited to the specific construction which I have illustrated or in any other way excepting as defined in the appended claims.

I claim:

1. In a motor vehicle body having a windshield and a cowl disposed substantially at right angles thereto, a device for preventing the condensation of moisture upon said windshield comprising an elongated wall portion disposed adjacent the inner surface of said windshield, an opening in said cowl, and a plate portion extending from the lower edge of said wall portion to said opening and beneath and spaced from said cowl to form a fluid current conduit between said plate portion and said cowl from said opening to said wall portion, said wall portion and said plate portion being mounted for joint pivotal movement about a longitudinal axis to vary the capacity of the fluid current conduits.

2. In a motor vehicle body having a windshield and a cowl disposed substantially at right angles thereto, a device for preventing the condensation of moisture upon said windshield comprising an elongated wall portion disposed adjacent the inner surface of said windshield and normally contacting said windshield, an opening in said cowl, a cover plate normally seated over said opening and spring means for holding said cover plate in seated position, a plate portion extending from the lower edge of said wall portion to said opening and beneath and spaced from said cowl to form a fluid current conduit between said plate portion and said cowl from said opening to said wall portion, said wall portion and said plate portion being mounted for joint pivotal movement about a longitudinal axis, and means on said plate portion contacting said cover plate whereby pivotal movement of said plate and wall portions opens said cover plate against the resistance of said spring means and simultaneously spaces the upper edge of said wall portion from the windshield.

3. In a motor vehicle body having a windshield and a cowl disposed substantially at right angles thereto, a device for preventing the condensation of moisture upon said windshield comprising an elongated wall portion disposed adjacent the inner surface of said windshield and normally contacting said windshield, an opening in said cowl, a cover plate normally seated over said opening and spring means for holding said cover plate in seated position, a plate portion extending from the lower edge of said wall portion to said opening and beneath and spaced from said cowl to form a fluid current conduit between said plate portion and said cowl from said opening to said wall portion, said wall portion and said plate portion being mounted for joint pivotal movement about a longitudinal axis, means on said plate portion contacting said cover plate whereby pivotal movement of said plate and wall portions opens said cover plate against the resistance of said spring means and simultaneously spaces the upper edge of said wall portion from the windshield, and means for securing said plate and cover means in selectively variable pivoted positions about their axis.

KASMER KRANTZ.